April 20, 1943.   J. A. BROWN   2,317,129
LINE GUIDE FOR FISHING RODS
Filed Feb. 26, 1942
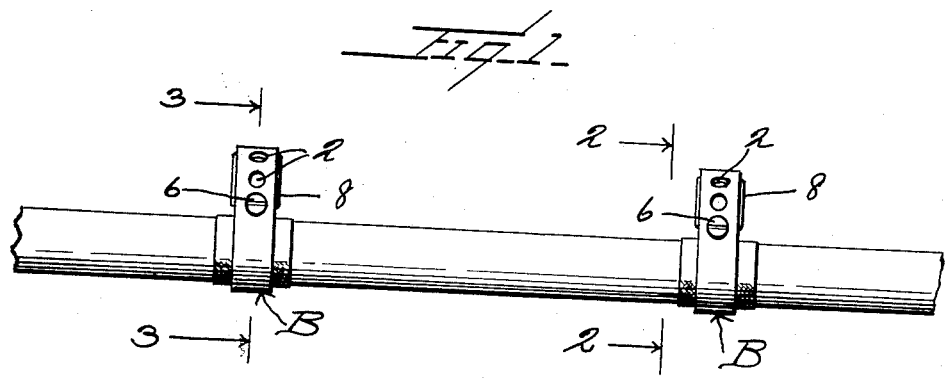
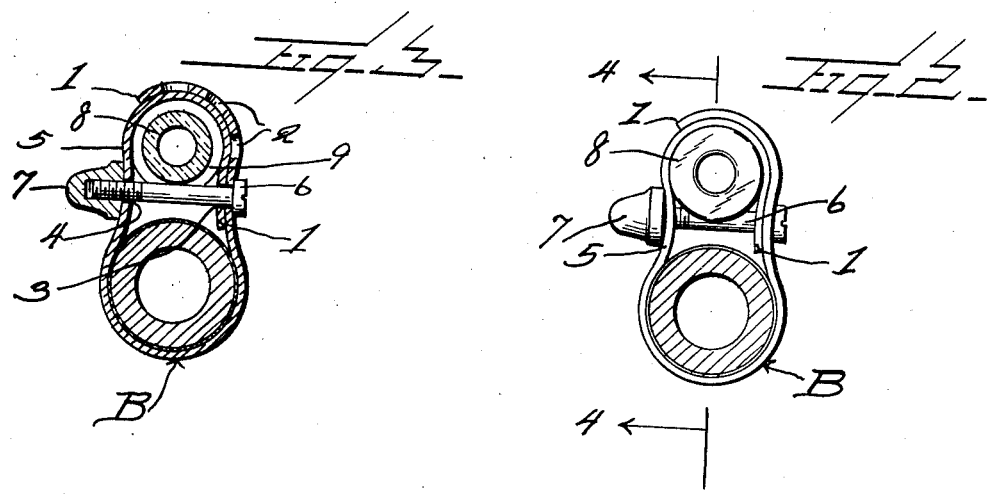
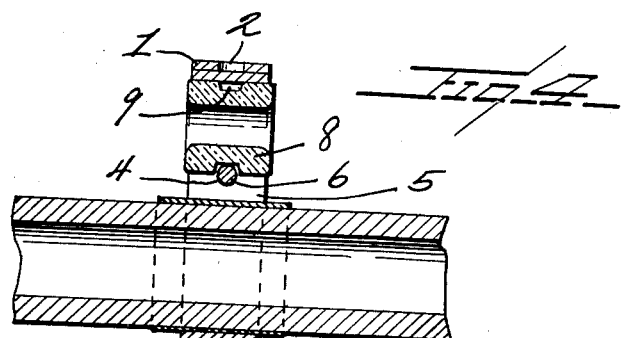
Inventor
James A. Brown
By Watson E. Coleman
Attorney Patented Apr. 20, 1943

2,317,129

UNITED STATES PATENT OFFICE 2,317,129

LINE GUIDE FOR FISHING RODS

James Arthur Brown, Baldwin Park, Calif.

Application February 26, 1942, Serial No. 432,497

3 Claims. (Cl. 43—24)

This invention relates to a line guide for a fishing rod, and it is an object of the invention to provide a device of this kind which can be readily applied as desired upon the pole and in a manner whereby the guide will be effectively maintained in its applied position.

The invention consists in the details of construction and in the combination and arrangement of the several parts of my improved line guide for a fishing rod whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in elevation showing a fishing rod in fragment having applied thereto line guides constructed in accordance with an embodiment of my invention;

Figure 2 is an enlarged sectional view taken substantially on the line 2—2 of Figure 1 looking in the direction of the arrows;

Figure 3 is an enlarged sectional view taken substantially on the line 3—3 of Figure 1 looking in the direction of the arrows;

Figure 4 is a fragmentary sectional view taken substantially on the line 4—4 of Figure 2 looking in the direction of the arrows.

As herein disclosed, my improved guide comprises a metal band B of desired width and length and which has its opposite end portions 1 returned or reverted with the extremities of said portions 1 overlapping. One of the returned portions 1 is provided therethrough with a series of longitudinally spaced openings 2 which are adapted to selectively register with an opening 3 in the extremity of the second reverted portion 1. This opening 3 is in transverse alignment with an opening 4 at substantially the longitudinal center of the opposed side part 5 of the band B. Insertible through the opening 4 and the registering openings 2 and 3 is a screw member 6 upon which threads a bell nut 7.

Snugly fitting within the device to one side of the screw member or threaded shank 6 is an eye member 8 of catalin, glass or other suitable material, and the periphery of this eye member 8 is provided with a groove or channel 9 in which is accommodated the adjacent portion of the screw or shank 6, thus facilitating the desired maintenance of the eye member 8 in place and holding the same against rotation.

The portion of the device to the side of the screw or shank 6 remote from the applied eye member 8 is placed around a fishing rod at the desired point thereof, the material being readily bendable to so allow for such application. The screw or shank 6 is then tightened to assure effective clamping of the device upon both the rod and the applied eye member. It is also of advantage in applying the device to a fishing rod to first encircle the rod with adhesive tape or the like and around which the device is engaged.

From the foregoing description it is thought to be obvious that a line guide for a fishing rod constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A line guide for a fishing rod comprising a band having its opposite end portions reverted with its free extremities lapping, a threaded member disposed through the side of the band opposite to the lapping extremities and through said lapping extremities, a nut threaded upon said member for coaction with the overlapping extremities, and an eye member within the band to one side of the threaded member, a portion of the band at the opposite side of the threaded member being adapted to encircle the rod, the threaded member and nut coacting to effectively clamp the eye member in place and to clamp the device to the rod.

2. A line guide for a fishing rod comprising a band having its opposite end portions reverted with its free extremities lapping, a threaded member disposed through the side of the band opposite to the lapping extremities and through said lapping extremities, a nut threaded upon said member for coaction with the overlapping extremities, and an eye member within the band to one side of the threaded member, a portion of the band at the opposite side of the threaded member being adapted to encircle the rod, the threaded member and nut coacting to effectively clamp the eye member in place and to clamp the device to the rod, the periphery of the eye member being provided with a groove to receive a portion of the threaded member.

3. A line guide for a fishing rod comprising a band having its opposite end portions reverted with its free extremities lapping, a threaded member disposed through the side of the band opposite to the lapping extremities and through said lapping extremities, a nut threaded upon said member for coaction with the overlapping extremities, and an eye member within the band to one side of the threaded member, a portion of the band at the opposite side of the threaded member being adapted to encircle the rod, the threaded member and nut coacting to effectively clamp the eye member in place and to clamp the device to the rod, one extremity of the band being provided with an opening and the second extremity having a series of longitudinally spaced openings with which the opening of the first extremity selectively registers, the threaded member extending through the registering openings.

JAMES ARTHUR BROWN.